3,196,156
1,4-BIS-(3-ETHYLENIMINOPROPIONYL)-PIPERA-
ZINE AND ALKYL DERIVATIVES THEREOF
Shigeho Inaba, Takarazuka, Atsuko Misaki, Ibaragi, and
Chiharu Saito, Toyonaka, Japan, assignors to Sumitomo
Chemical Co., Ltd., Osaka, Japan
No Drawing. Filed Apr. 3, 1964, Ser. No. 357,296
Claims priority, application Japan, Apr. 11, 1963,
38/19,153
4 Claims. (Cl. 260—268)

This invention relates to novel alkyleniminopropionyl compounds, their productions and therapeutic compositions comprising the said compounds.

Recently, a number of alkylating agents or compounds containing bis-(β-chloroethyl)amino, methanesulfonyl and ethylenimino groups in the molecule have been studied as carcinostatic agents. However, their serious toxicity and undesirable side effect, especially leucopenic action have been preventing their practical application.

It is an object of this invention to provide novel compounds which have excellent carcinostatic activity.

Another object of this invention is to provide a method for preparing the said new compounds.

Still another object of this invention is to provide a novel carcinostatic composition.

Other objects of this invention will be apparent from the following description.

The novel alkyleniminopropionyl compounds with which the present invention is concerned are represented by the following general formula:

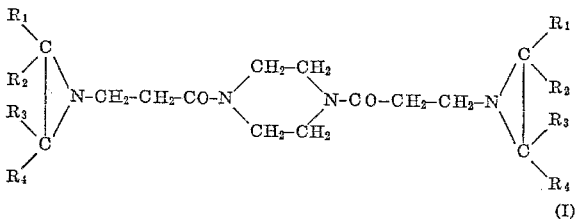

(I)

wherein each of $R_1$, $R_2$, $R_3$ and $R_4$ represents a member selected from the group consisting of hydrogen atom and lower alkyl radicals.

According to this invention the novel alkyleniminopropionyl compounds of the Formula I are prepared by reacting N,N'-bis-acryloyl piperazine of the formula:

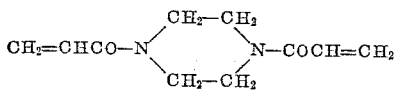

(II)

with an alkylenimine compound of the formula:

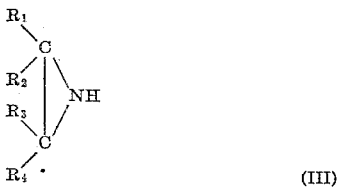

(III)

wherein each of $R_1$, $R_2$, $R_3$ and $R_4$ is as defined before.

The starting compound, N,N'-bis-acryloyl piperazine of the Formula II may be prepared, for example, by condensing piperazine with acryloyl chloride.

Among the alkylenimine compounds (ethylene imine and its lower alkyl derivatives) are, for example, ethylenimine,
propylenimine,
2-ethylethylenimine,
2-propylethylenimine,
2-butylethylenimine,
2,2-dimethylethylenimine,
2,2-diethylethylenimine,
2,2-dipropylethylenimine,
2,2-dibutylethylenimine,
2,3-dimethylethylenimine,
2,3-diethylethylenimine,
2,3-dipropylethylenimine,
2,3-dibutylethylenimine,
2-methyl-3-ethylethylenimine,
2-methyl-3-propylethylenimine,
2-methyl-2-butylethylenimine,
2,2,3-trimethylethylenimine,
2,2-dimethyl-3-ethylethylenimine,
2,2-dimethyl-3-propylethylenimine,
2,2,3,3-tetramethylethylenimine,
2-ethyl-2,3,3-trimethylethylenimine,
2-propyl-2,3,3-trimethylethylenimine, and other alkylenimines having lower alkyl radical(s) of 1 to 4 carbon atoms.

In carrying out the method of this invention, the addition reaction of the N,N'-bis-acryloylpiperazine with an alkylenimine may be effected in any conventional manner well known in the art, either by simply mixing them together, or more preferably, by mixing them in a liquid medium in the presence of a tertiary amine such as triethylamine and pyridine, or a basic agent such as alkali alcoholates, alkali hydroxides, alkali carbonates, alkali bicarbonates.

The liquid medium employed in the present reaction may includes any kind of well known organic solvents, provided that it does not affect the reaction, for example, methanol, ethanol, butanol, tetrahydrofuran, and the like.

The mol ratio of N,N'-bis-acryloylpiperazine to alkylenimine may be chosen in a broad range. Ordinarily, the alkylenimine is employed in 2 mol or more per mol of N,N'-bis-acryloylpiperazine.

The reaction may proceed in a broad temperature range, e.g. from about −10° C. to about 100° C., for example, merely by keeping the reaction mixture at room temperature for 24–72 hours, or by heating the mixture at a temperature of about 50° C. at which the reaction is completed within several hours.

When the reaction is over, the objective compound may be isolated from the reaction mixture according to the ordinary procedure. For example, the reaction mixture is evaporated at a reduced pressure to remove the solvent. The resulting residue, objective product, may be recrystallized from a suitable solvent.

All of the compounds of this invention are novel ones, and are very useful as therapeutic agents and show unexpected excellent carcinostatic activity and pharmacological actions which are specific in that they possess a very slight leucopenia and cumulative action, and which are unobvious from the known compounds of similar series.

According to biological tests, the compounds of this invention show excellent inhibiting effect on the transplanted tumour, with low toxicity. Therefore, they are very important as potential therapeutic agents.

For example, the LD$_{50}$ (mice I.P.) of the N,N'-bis-ethyleniminopropionylpiperazine is 41 mg./kg., and the compound shows excellent cytological effect on the tumour cells in the ascites when 0.25 mg./kg. of the compound is administered intraperitoneally into a rat bearing Yoshida sarcoma.

Further, it shows an inhibition ratio of more than 60% on the solid type of Ehrlich carcinoma by consecutive intraperitoneal injections of 2.0 mg./kg./day during 1–8 days.

The following table shows biological test data of a typical compound of the present invention as compared with some commercially available antitumor agents.

| Compound | $LD_{50}$ mice i.p. (mg./kg.) | Ehrlich Carcinoma (Solid) M.E.D. (mg./kg./day) | Ehrlich Carcinoma (Ascites) M.E.D. (mg./kg./day) |
|---|---|---|---|
| N,N'-bis-(β-ethyleniminopropionyl)piperazine (present compound) | 41 | 1.0 | 0.5 |
| HN$_2$-Oxide | 96 | 10 | (1) |
| Cyclophosphamide | Ca. 500 | 40 | 40 |
| Mitomycin-C | 6.6 | 1.0 | 0.25 |

[1] Slightly effective.

The present compounds may be regarded as a kind of alkylating agents. However, their leucopenic action is slight in contrast to the heretofore known alkylating agents having, in general, serious leucopenic action. Further, their cumulative action is very slight.

Still further, the compounds of the present invention are useful as a textile treating agent for the purpose of imparting crease resistance and dyeability to textiles, a cross-linking agent for the purpose of increasing heat stability of a high molecular weight polymers, and a raw material of paints and adhesives.

The method of the present invention will be illustrated by the following examples which are given merely by way of illustration and not by way of limitation.

Example 1

To a solution of 3.5 g. of N,N'-bis-acryloylpiperazine and 4.6 g. of triethylamine in 20 ml. of methanol was added dropwise with shaking 2.3 g. of ethylenimine at room temperature under nitrogen atmosphere. The reaction mixture was allowed to stand in the dark for about 48 hours at room temperature. The solvent was removed in vacuo and the residue on treatment with dry ether gave 4.2 g. of a white solid.

Recrystallization from warm benzene with addition of petroleumbenzine afforded 3.9 g. of N,N'-bis-(β-ethyleniminopropionyl)piperazine, M.P. 108–109° C. (uncorrected) as a hygroscopic white solid.

The product was soluble in water, methanol, ethanol and benzene and almost insoluble in petroleum benzine and n-hexane.

*Analysis.*—Calcd. for $C_{14}H_{24}N_4O_2$: C, 59.97%; H, 8.63%; N, 19.98%. Found: C, 59.51%; H, 8.70%; N, 20.03%.

Example 2

To a solution of 2.5 g. of N,N'-bis-acryloylpiperazine and 3.3 g. of triethylamine in 15 ml. of methanol was added dropwise with stirring 1.5 g. of ethylenimine. After the addition, the reaction mixture was gradually heated to 50° C. and kept at the same temperature for 5 hours under nitrogen atmosphere. The solvent was removed in vacuo to give 3.0 g. of N,N'-bis-(β-ethyleniminopropionyl)piperazine. Recrystallization from benzene-petroleum benzine afforded 2.8 g. of a white solid, M.P. 108–109° C. The identity with that obtained in Example 1 was confirmed by the mixture melting point and infra red spectra.

Example 3

To a solution of 3.5 g. of N,N'-bis-acrylolylpiperazine and 4.6 g. of triethylamine in 15 ml. of methanol was added dropwise with shaking 3.3 g. of 2,2-dimethylethylenimine at room temperature under nitrogen atmosphere. The reaction mixture was allowed to stand in the dark for about 48 hours at room temperature. The reaction mixture was evaporated in vacuo to colorless sirup which solidified under ether in refrigerator (overnight). The resulting solid was filtered, washed with cold ether and then dried to give 2.1 g. of N,N'-bis-[β-(2,2-dimethylethylenimino)propionyl]piperazine as a white solid, which was soluble in water, methanol, ethanol, benzene, ethyl acetate and tetrahydrofuran, and almost insoluble in petroleum benzine and n-hexane. The product gave a single spot ($R_f=0.35$) and no contamination from the starting material on thin layer chromatography on silica gel with chloroformdiethylamine (9:1), detected with the Dragendorff's reagent or permanganate-sulfuric acid.

*Analysis.*—Calcd. for $C_{18}H_{32}N_4O_2$: C, 64.25%; H, 9.59%; N, 16.65%. Found: C, 63.98%; H, 9.92%; N, 16.34%.

Example 4

To a solution of 3.5 g. of N,N'-bis-acryloylpiperazine and 4.6 g. of triethylamine in 20 ml. of methanol was added dropwise with stirring, 2.6 g. of propylenimine at room temperature under nitrogen atmosphere. The reaction mixture was allowed to stand in the dark for about 48 hours at room temperature.

The solvent was removed in vacuo and the residue was treated with dry ether. The resulting solid was filtered, washed with dry ether and then dried to give 2.2 g. of a white solid. Recrystallization from benzene-petroleum benzine afforded 1.5 g. of N,N'-bis-(β-propyleniminopropionyl)piperazine as a white solid, which was soluble in water, methanol, ethanol, benzene and ethylacetate and almost insoluble in petroleum benzine.

The product gave a single spot ($R_f=0.25$) and no contamination from the starting material on thin layer chromatography on silica gel with chloroform-diethylamine (9:1) detected with the Dragendorff's reagents or permanganate sulfuric acid.

*Analysis.*—Calcd. for $C_{16}H_{28}N_4O_2$: C, 62.30%; H, 9.15%; N, 18.17%. Found: C, 62.25%; H, 9.39%; N, 17.76%.

What we claim is:

1. Alkyleniminopropionyl piperazine of the formula:

$$\begin{array}{c} R_1 \\ \diagdown \\ R_2 \diagup C \diagdown \\ \quad\quad N-CH_2CH_2-CO-N \\ R_3 \diagup \diagdown \\ \diagup C \\ R_4 \end{array} \begin{array}{c} CH_2-CH_2 \\ \diagdown \\ \diagup \\ CH_2-CH_2 \end{array} \begin{array}{c} \\ N-CO-CH_2-CH_2-N \\ \end{array} \begin{array}{c} R_1 \\ \diagup \\ \diagup C \diagdown R_2 \\ \quad\quad\quad R_3 \\ \diagdown C \diagup \\ \diagdown R_4 \end{array}$$

wherein $R_1$, $R_2$, $R_3$ and $R_4$ each is a member selected from the group consisting of H and lower alkyl.

2. N,N'-bis-(β-ethyleniminopropionyl)piperazine.
3. N,N'-bis-(β-propyleniminopropionyl)piperazine.
4. N,N'-bis-[β-(2,2-dimethylethylenimino)propionyl]piperazine.

References Cited in the file of this patent

FOREIGN PATENTS 673,586  11/63  Canada.

OTHER REFERENCES

Abderhalden: Chemical Abstracts, vol. 19, page 2830(3) (1925).

Bergel: British Medical Journal, pages 399–403 (Aug. 12, 1961).

Burchenal et al: Cancer, volume 4, pages 353–356 (1951).

Cancer Research, vol. 18, No. 8, pages 49–53 and 156, Entry No. 8344 (September 1958).

Davis: Manufacturing Chemist, volume 31, pages 233–237 (1960).

New and Nonofficial Drugs, NND, pages 183–190 (1959).

Wilson et al.: Proc. Am. Assoc. Cancer Research, vol. 3, page 372, Entry No. 294 (March 1962).

NICHOLAS S. RIZZO, *Primary Examiner.*